US012594200B2

(12) United States Patent
Dombrowsky et al.

(10) Patent No.: US 12,594,200 B2
(45) Date of Patent: Apr. 7, 2026

(54) RAIL VEHICLE WITH FULLY INTEGRATED WHEELCHAIR ZONE

(71) Applicant: Siemens Mobility GmbH, Munich (DE)

(72) Inventors: Martin Dombrowsky, Cologne (DE); Florian Kemper, Heiden (DE); Ulrich Klein, Meerbusch (DE)

(73) Assignee: Siemens Mobility GmbH, Munich (DE)

(*) Notice: Subject to any disclaimer, the term of this patent is extended or adjusted under 35 U.S.C. 154(b) by 770 days.

(21) Appl. No.: 17/917,753

(22) PCT Filed: Mar. 5, 2021

(86) PCT No.: PCT/EP2021/055639
§ 371 (c)(1),
(2) Date: Oct. 7, 2022

(87) PCT Pub. No.: WO2021/204473
PCT Pub. Date: Oct. 14, 2021

(65) Prior Publication Data

US 2023/0165739 A1 Jun. 1, 2023

(30) Foreign Application Priority Data

Apr. 7, 2020 (DE) ..................... 10 2020 204 471.6

(51) Int. Cl.
*A61G 3/08* (2006.01)
*B61D 1/00* (2006.01)
(Continued)

(52) U.S. Cl.
CPC ............. *A61G 3/0808* (2013.01); *A61G 3/08* (2013.01); *B61D 1/00* (2013.01); *B61D 1/04* (2013.01); *B61D 35/005* (2013.01); *B61D 49/00* (2013.01)

(58) Field of Classification Search
CPC .......... A61G 3/0808; A61G 3/08; B61D 1/00; B61D 1/04; B61D 35/005; B61D 49/00
(Continued)

(56) References Cited

U.S. PATENT DOCUMENTS 4,184,433 A * 1/1980 Green .................... B61D 37/00 105/325
5,474,260 A * 12/1995 Schwertfeger ......... B64D 11/00 244/118.5
(Continued)

FOREIGN PATENT DOCUMENTS

AU 2005200691 A1 9/2005
CN 107898350 A * 4/2018 ............. G06Q 10/02
(Continued)

OTHER PUBLICATIONS

Deutsche Bundesbahn, Vehicle lexicon for long-distance traffic, Reference book, Sep. 2017, 17th edition, Germany.
(Continued)

*Primary Examiner* — S. Joseph Morano
*Assistant Examiner* — James William Jones
(74) *Attorney, Agent, or Firm* — Laurence A. Greenberg; Werner H. Stemer; Ralph E. Locher

(57) ABSTRACT

A rail vehicle for transporting passengers includes at least one wheelchair zone, at least one boarding door, at least one sanitary unit, and at least one galley. The sanitary unit and the galley are disposed between the boarding door and the wheelchair zone. An aisle or path, which is configured to be adequate for wheelchair use, leads from the boarding door to the wheelchair zone.

13 Claims, 1 Drawing Sheet

(51) Int. Cl.

| | |
|---|---|
| ***B61D 1/04*** | (2006.01) |
| ***B61D 35/00*** | (2006.01) |
| ***B61D 49/00*** | (2006.01) |

(58) Field of Classification Search
USPC ....................... 105/345, 344, 343, 329.1, 315
See application file for complete search history.

(56) References Cited

U.S. PATENT DOCUMENTS

| | | | | |
|---|---|---|---|---|
| 2009/0255437 | A1 | 10/2009 | Hachet et al. | |
| 2012/0261509 | A1 | 10/2012 | Grant et al. | |
| 2015/0164716 | A1* | 6/2015 | Kilduff | A61G 3/0808 410/7 |
| 2015/0360702 | A1* | 12/2015 | Klein | B61D 1/00 105/329.1 |
| 2019/0262198 | A1* | 8/2019 | Girardin | B60R 22/20 |
| 2019/0389491 | A1* | 12/2019 | Sarti | B61D 1/06 |

FOREIGN PATENT DOCUMENTS

| | | | | | |
|---|---|---|---|---|---|
| CN | 110893866 | A | * | 3/2020 | B61D 37/006 |
| DE | 9416537 | U1 | | 1/1995 | |
| DE | 102017008684 | A1 | * | 3/2018 | B61D 37/003 |
| DE | 102017217223 | A1 | * | 3/2019 | B61D 1/00 |
| EP | 2060470 | A2 | | 4/2009 | |
| EP | 2060469 | A2 | | 5/2009 | |
| EP | 2100789 | A1 | | 9/2009 | |
| EP | 2535236 | A2 | * | 12/2012 | B61D 1/00 |
| EP | 3251912 | A1 | | 12/2017 | |
| JP | 2003089355 | A | | 3/2003 | |
| WO | WO-2008033360 | A2 | * | 3/2008 | A61G 5/128 |
| WO | WO-2013045256 | A1 | * | 4/2013 | B61D 31/00 |

OTHER PUBLICATIONS

Stadler, Electric Multi-Train Flirt, Norske tog AS, Norway, https://stadlerrail.com/media/pdf/fnsb0919_d.pdf.
Grand Central Rail, Adelante seating plan, British Rail Class 180, https://sites.create-cdn.net/sitefiles/19/3/4/193478/GC_Seating_Plans_2018.pdf.
Llewelyn, "Alstom (Birmingham) Class 180 Coradia" (ex-"Adelante"), https://en.wikipedia.org/wiki/British_Rail_Class_180#/media/File:180_107_Kings_Cross(8077807274).jpg, Aug. 30, 2012, England. (Supporting picture to NPL 3).
Eurostar, e320 Seating Plan Coaches 9-16, https://flockler.com/files/sites/891/e320-seating-plan-en--9bydms3bv5.pdf.
Siemens AG, Eurostar e320 high-speed trains for Eurostar International Limited, https://assets.new.siemens.com/siemens/assets/api/uuid:d27caceb-11bd-4614-b7ac-5e02468e1481/broschuere-velaro-e320-eurostar-de.pdf, 2014, Germany.
European Union, Commission Delegated decision EU 2017/1474 of Jun. 8, 2017, https://eur-lex.europa.eu/eli/dec_del/2017/1474/oj.
Korea Railway, ITX-Cheongchun Seatmap & layout, car 3, https://korearailway.com/en/seat-map-itx-cheongchun-express-train-in-south-korea/.
Korea Railway, ITX vending machine, https://korearailway.com/en/express-train-itx-cheongchun-in-south-korea/ (Supporting picture for NPL 8).
Rodriguez, Avril by Talgo, the new Renfe high-speed train, Via Libre, No. 613, Dec. 2016.
Flowers, First Great Western's "Adelante"—first impressions, Modern Railways magazine, Jul. 2002, pp. 28-35.
European Union Agency for Railways, Report N. ERA-REC-128-2/ACR—Mar. 20, 2020, https://www.era.europa.eu/content/recommendation-revision-technical-specification-interoperability-relating-%E2%80%98accessibility_en.
European Union Agency for Railways:"Accompanying Report N. ERA-REC-128-2/ACR2"; Dec. 3, 2021, pp. 1, 2, 8, 9; URL: https://www.era.europa.eu.

* cited by examiner

RAIL VEHICLE WITH FULLY INTEGRATED WHEELCHAIR ZONE

FIELD AND BACKGROUND OF THE INVENTION

The invention relates to a rail vehicle for passenger transport, having at least one wheelchair zone, at least one boarding door, at least one sanitary unit and at least one galley.

People with reduced mobility (abbreviated to PRM), in particular wheelchair users, commonly have only restricted access to facilities, for example with the exception of correspondingly suitably designed sanitary units, in rail vehicles for public passenger transport, for example to the galley or to ticket vending machines. Moreover, wheelchair spaces are generally arranged in a separate zone, such that no integration into the seating location area is provided, nor is access to said seating location area made possible. The wheelchair spaces are often provided in the area of boarding doors.

Galleys are also referred to as on-board kitchens, if appropriate as on-board bistros. They traditionally comprise preparation rooms, a sales counter and tables. However, galleys have also become known that have self-service food and beverage machines.

SUMMARY OF THE INVENTION

The invention is based on the object of improving the usability of various facilities of the rail vehicle for people with reduced mobility.

The object is achieved by means of the subject matter of the independent patent claim 4. Refinements and further developments of the invention can be found in the features of the dependent patent claims.

A rail vehicle according to the invention for passenger transport comprises at least one wheelchair zone, sometimes also referred to as wheelchair seating area, at least one first boarding door, at least one sanitary unit, which is in particular suitable for and can thus be used by people with reduced mobility, and at least one galley. The sanitary unit and the galley are in this case arranged between the at least one first boarding door and the wheelchair zone, wherein an aisle that is configured to be adequate for the use of a wheelchair is provided from the at least one first boarding door to the wheelchair zone. This means in particular that the aisle has an aisle width great enough to allow the aisle to serve as a passage for a wheelchair. The aisle, and the facilities and components of the rail vehicle adjacent to said aisle, are selected, configured and dimensioned accordingly.

Here, the wheelchair zone has at least one wheelchair space. According to one refinement of the rail vehicle according to the invention, the wheelchair zone has at least two wheelchair spaces, which are arranged to both sides of the aisle. The aisle leads through the wheelchair zone, or the wheelchair zone is divided by the aisle. Wheelchair spaces are thus arranged on both sides of the rail vehicle. The arrangement of two or possibly more wheelchair spaces on one side of the aisle, for example in a row, is also possible.

Alternatively, at least one seating location for further passengers is arranged on that side of the aisle which is situated opposite the wheelchair zone. It is also possible for multiple seating positions situated one behind the other, or one or more seating rows with seating positions for further passengers, to be arranged on the other side of the aisle. In one embodiment, the at least one wheelchair space is arranged in the wheelchair zone so as to have the same viewing direction as the at least one seating location on that side of the aisle which is situated opposite the wheelchair zone.

Here, the aisle runs in particular in a longitudinal direction of the rail vehicle. The seating locations and/or wheelchair spaces arranged on the different sides of the aisle are thus arranged adjacent to one another, in particular parallel to one another, in a transverse direction of the rail vehicle.

In one refinement, both the at least one wheelchair space in the wheelchair zone and the at least one seating location on that side of the aisle which is situated opposite the wheelchair zone are oriented with a viewing direction in a longitudinal direction of the rail vehicle. The same applies to two wheelchair spaces of the wheelchair zone that are arranged on both sides of the aisle. They, too, are in particular oriented in the same viewing direction, in particular in a longitudinal direction of the rail vehicle.

In a further refinement of the invention, provision is made whereby at least one wheelchair space in the wheelchair zone is, in particular as viewed in a longitudinal direction of the rail vehicle, arranged so as to be directly adjacent to further seating locations for further passengers. Here, the further seating locations have seats, which are in particular fixedly installed in the rail vehicle, for the further passengers. If multiple seating locations for further passengers are arranged in a common area, in particular at least two seating locations to both sides of an aisle, this can also be referred to as one seating location zone.

The further seating locations, in particular the seating location zone, are thus arranged at least between the wheelchair zone and at least one further, second boarding door of the rail vehicle, which at least one further, second boarding door is arranged on that side of the wheelchair zone which is situated opposite the galley and the sanitary unit in a longitudinal direction of the rail vehicle. An aisle from the at least one further, second boarding door to the wheelchair zone—and thus through the seating location zone—may duly be configured to be adequate for a wheelchair. According to one embodiment of the invention, such an aisle between the seating locations for further passengers from the at least one further, second boarding door to the wheelchair zone is however not suitable for a wheelchair. Said aisle is at least configured to be narrower. For example, the seat spacing is smaller. The aisle is however in any case adequate to serve as a passage for passengers and in particular also for a galley trolley or serving trolley.

In particular, the wheelchair space is bordered to both sides in a longitudinal direction of the rail vehicle by adjacent seating locations. The further seating locations thus surround the wheelchair space in a longitudinal direction of the rail vehicle, whereby the wheelchair space is fully integrated into the seating location area for further passengers. Alternatively, the wheelchair space is directly adjacent to the galley.

In a further refinement, at least one wheelchair space is arranged in the wheelchair zone so as to have the same viewing direction as the seating locations directly adjacent thereto, in particular as the seating locations which directly surrounding said wheelchair space and which have seats for the further passengers.

Alternatively, at least one wheelchair space in the wheelchair zone is oriented oppositely to at least one seating location adjacent thereto, in a so-called vis-à-vis arrangement, in particular with a table arranged in between, for example a folding table. The passengers can thus sit opposite one another and, in the embodiment with the table, can also sit together at the same table.

In one refinement, both the at least one wheelchair space in the wheelchair zone and at least the seating locations directly adjacent thereto are oriented with a viewing direction in a longitudinal direction of the rail vehicle.

A further refinement consists in that at least one seating location, for example also at least one seating row with at least two seats arranged adjacent to one another for further passengers, is arranged between the wheelchair zone and the galley. The aisle from the at least one first boarding door to the wheelchair zone, which aisle is configured to be adequate for a wheelchair, then also leads past said at least one seating location. In one refinement, a seating position zone with at least two seating positions to both sides of the aisle that is configured to be adequate for a wheelchair is arranged between the wheelchair zone and the galley.

In a further refinement, the rail vehicle has no internal door between the at least one first boarding door and the wheelchair zone. There is also no internal wall between the at least one first boarding door and the wheelchair zone. In a further refinement, the rail vehicle has no internal door between the wheelchair zone and the seating locations directly adjacent to the wheelchair zone. The rail vehicle advantageously also has no internal door or internal wall directly adjacent to the wheelchair zone. If a partition with an internal door is provided, this is n particular configured as an automatic internal door. Automatic internal doors open and close without manual actuation, in particular in a manner controlled by sensors. If a partition with an internal door is provided between the wheelchair zone and the seating locations directly adjacent to the wheelchair zone, said partition may have a wheelchair anchor point for securing the wheelchair.

As already stated above, the wheelchair zone may be arranged in a car body of the rail vehicle—and as viewed in a longitudinal direction of the rail vehicle-between two boarding doors of the rail vehicle. The sanitary unit and the galley are then arranged between the first boarding door and the wheelchair zone. Further seating locations for further passengers are arranged between the further, second boarding door and the wheelchair zone. In one exemplary embodiment of the invention, the rail vehicle has no internal door between the first and the second boarding door.

A further refinement consists in that the area of the at least one first boarding door has no wheelchair zone. In one refinement, it is also the case that there is no boarding door in the immediate surroundings of the wheelchair zone. In particular, the rail vehicle has no further boarding door between the at least one first boarding door and the further, second boarding door.

The sanitary unit is advantageously arranged in the area of the at least one first boarding door such that the entrance to the sanitary unit points toward the at least one first boarding door. The galley is then arranged between the sanitary unit and the wheelchair zone.

In one refinement, the sanitary unit is arranged in the area of the at least one first boarding door, wherein the rail vehicle has no further boarding door between the sanitary unit and the wheelchair zone.

As already stated above, one or more seating locations, in particular in the form of seating rows with seats for further passengers, may be arranged between the wheelchair zone and the galley. In addition or alternatively, the galley may, in one refinement, comprise a standing location area for visitors to the galley, wherein at least one further facility of the rail vehicle, for example of the galley, in particular for active use by a passenger, such as a ticket vending machine, a ticket validating machine or at least one galley device, such as a food or beverage machine, or at least one galley facility item or galley furniture item, for example one or more tables, is arranged between the standing location area of the galley and the wheelchair zone. A wheelchair anchor point may also be provided there. The wheelchair zone is not arranged directly adjacent to the standing location area of the galley but is rather demarcated with respect to this facility, in particular by a ticket vending machine, a ticket validating machine, a food or beverage machine or at least one galley table. The facility may have no luggage area. Areas for the stowage and storage of luggage and of galley trolleys are then not arranged directly adjacent to the at least one wheelchair zone.

The separation of the wheelchair zone from standing locations or boarding areas close to the boarding doors of the rail vehicle, and the integration of said wheelchair zone into seating location zones, leads to a betterment of said wheelchair zone.

In one refinement, the galley comprises at least one standing location area with at least one standing table that is configured to accommodate and conceal at least one further device or at least one further facility of the rail vehicle, in particular at least one galley device or at least one galley facility, for example galley trolleys, air extraction facilities or further electrical assemblies.

Devices comprise machines and apparatuses. They may also be movable and detachable from the rail vehicle. By contrast, facilities may also be of a passive nature and are normally fixedly installed.

Installation space of the devices and facilities is thus expediently integrated into facilities that are usable by a passenger, whereby further space is created for the passengers.

One further development of the invention provides for the galley and the sanitary unit to be arranged relative to one another, for example directly adjacent to one another, such that specified infrastructure facilities of the rail vehicle, for example supplying electricity or facilities for compressed air to the galley and the sanitary unit and/or for the supply and disposal of water and/or air, for example for air conditioning, in particular lines, can be jointly utilized.

For example, a common air conditioning device, a common heating arrangement or a common ventilation arrangement, a common compressed-air compressor and/or a common auxiliary inverter device are thus possible. In this way, too, in particular through the omission of redundant or additional devices or facilities, the space that can be used by passengers is enlarged.

In one refinement, the specified infrastructure facilities of the rail vehicle for the provision of a supply both to the galley and to the sanitary unit are arranged between the galley and the sanitary unit.

In one refinement, a utility room which comprises the infrastructure facilities of the rail vehicle for the provision of a supply to the galley and to the sanitary unit, and/or which comprises at least one control facility for the control of the infrastructure facilities of the rail vehicle for the provision of a supply to the galley and to the sanitary unit, is arranged between the galley and the sanitary unit. Said utility room could thus be regarded as being assigned to the sanitary unit or to the galley, and thus also referred to as galley utility room or sanitary utility room. The arrangement is referred to as a back-to-back arrangement.

Alternatively, the galley, in particular a galley device or a galley facility, is arranged directly adjacent to the sanitary unit.

The advantages of the invention lie in the full integration of people with reduced mobility into the "normal" passenger area, and are associated with a betterment resulting from easy access to the sanitary unit in the boarding area and to the galley.

The invention allows for numerous embodiments. It will be discussed in more detail on the basis of the following figures, which each illustrate an exemplary embodiment. Identical elements in the figures are denoted by the same reference designations.

DETAILED DESCRIPTION OF THE INVENTION

Figure 1:
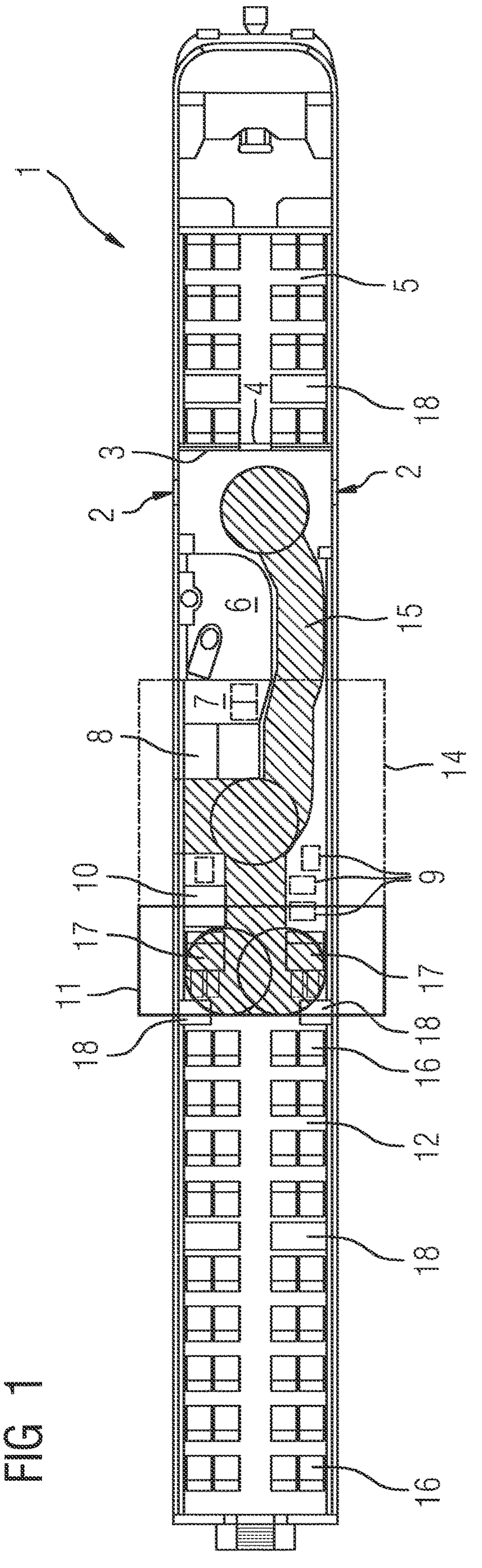
FIG. 1 schematically shows the interior compartment of a rail vehicle according to the invention in a first embodiment.

FIG. 1 schematically illustrates the interior compartment of a rail vehicle 1 according to the invention. The rail vehicle 1 comprises a boarding area with first boarding doors 2 arranged on both sides. Arranged adjacent to the boarding area is a partition 3 with an internal door 4 which separates a first seating location zone 5 with multiple seats for passengers from the boarding area.

On the other side as viewed in a longitudinal direction of the rail vehicle 1, the boarding area is adjoined by a sanitary unit 6. The sanitary unit 6 is a so-called universal sanitary unit that is also suitable for people with reduced mobility who are reliant on a wheelchair. The entrance to the sanitary unit 6 points toward one of the first boarding doors 2. Directly adjacent to the sanitary unit, there is a utility room 7 that accommodates infrastructure facilities for the sanitary unit 6 and for a galley 14 and/or the control means thereof. The galley itself comprises a beverage and food machine 8, which in turn is arranged in the rail vehicle so as to be directly adjacent to the utility room, and comprises further facilities, such as standing tables 9. The standing tables 9 have a further benefit in that they can accommodate and conceal galley devices or facilities, such as galley trolleys. Yet further facilities, for example ticket vending machines, or a standing area 10 may be arranged between the standing tables 9 and a wheelchair zone 11.

Here, the wheelchair zone 11 comprises two wheelchair spaces to both sides of an aisle 15. The aisle between the first boarding doors 2 and the wheelchair zone 11 is wide enough serve as a passage for a wheelchair. It leads past the sanitary unit 6 and through the galley 14.

On a side of the wheelchair zone 11 that faces away from the first boarding doors 2, there is arranged a further seating location zone 12 with multiple parallel seating rows with an aisle in between, the width of which aisle is narrower and is thus not suitable for a wheelchair.

The wheelchair spaces 17 of the wheelchair zone 11 and those seating locations 16 of the further seating location zone 12 which are directly adjacent to said wheelchair spaces are in this case in a vis-à-vis arrangement, with a table 18 in between.

Figure 2:
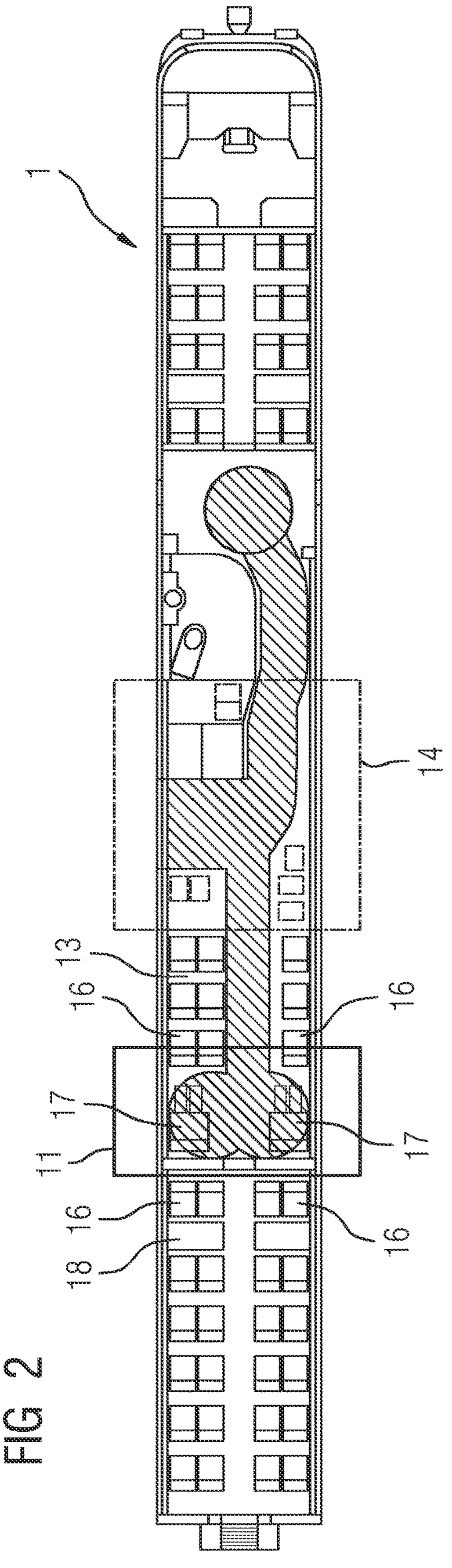
FIG. 2 shows a further embodiment of a rail vehicle according to the invention.

FIG. 2 illustrates a variant of the rail vehicle 1. Here, a further seating position zone 13 is arranged between the first boarding doors 2 and the wheelchair zone 11, directly adjacent to the wheelchair zone 11. In order to be able to provide an aisle 15 that is suitable for wheelchairs, seating rows with two seats arranged adjacent to one another are arranged on one side of the aisle 15, and only single seats are arranged on the other side, but several of these seating rows interrupted by the aisle are provided one behind the other in parallel.

The wheelchair spaces of the wheelchair zone 11 and those seating locations 16 of the further seating location zone which are directly adjacent to said wheelchair spaces are in this case oriented in the same way, such that they have the same viewing direction.

Arranged behind the wheelchair spaces of the wheelchair zone is a partition with an automatic internal door, wherein wheelchair anchor points for securing wheelchairs are arranged in the area of the partition.

The invention claimed is:

1. A rail vehicle for passenger transport, the rail vehicle comprising:

at least one wheelchair zone, at least one boarding door, at least one sanitary unit and at least one galley;

said sanitary unit and said galley being disposed between said boarding door and said wheelchair zone; and an aisle leading from said boarding door to said wheelchair zone and passing through said galley, in a longitudinal direction of the rail vehicle, said aisle configured to be adequate for use by a wheelchair.

2. The rail vehicle according to claim 1, wherein said aisle has sides, and said wheelchair zone has at least two wheelchair spaces, at least one of said wheelchair spaces being disposed on each respective side of said aisle.

3. The rail vehicle according to claim 2, which further comprises further seating locations with seats for further passengers, at least one of said wheelchair spaces in said wheelchair zone being disposed directly adjacent said further seating locations.

4. The rail vehicle according to claim 2, wherein at least one of said wheelchair spaces in said wheelchair zone has a viewing direction identical to seating locations directly adjacent said at least one wheelchair space.

5. The rail vehicle according to claim 2, wherein at least one of said wheelchair spaces in said wheelchair zone is oriented oppositely to at least one seating location adjacent said at least one wheelchair space.

6. The rail vehicle according to claim 1, which further comprises at least one seating location with a seat for a further passenger is disposed between said wheelchair zone and said galley.

7. The rail vehicle according to claim 1, wherein the rail vehicle has no internal door between said boarding door and said wheelchair zone.

8. The rail vehicle according to claim 1, which further comprises seating locations directly adjacent said wheelchair zone, said rail vehicle having no internal door between said wheelchair zone and said seating locations directly adjacent said wheelchair zone.

9. The rail vehicle according to claim 1, wherein said sanitary unit is disposed in a vicinity of said boarding door, and the rail vehicle has no further boarding door between said sanitary unit and said wheelchair zone.

10. The rail vehicle according to claim 1, wherein said galley has at least one standing location area, and at least one further facility or device of the rail vehicle is disposed between said at least one standing location area of said galley and said wheelchair zone.

11. The rail vehicle according to claim 1, wherein said galley includes at least one standing location area with at least one standing table, and said at least one standing table is configured to accommodate and conceal at least one further device or at least one further facility of the rail vehicle.

12. The rail vehicle according to claim 1, which further comprises specified infrastructure facilities of the rail vehicle for supplying said galley and said sanitary unit are disposed between said galley and said sanitary unit.

13. The rail vehicle according to claim 1, which further comprises a utility room including at least one supply facility for supplying said galley, said utility room being disposed between said galley and said sanitary unit.

* * * * *